United States Patent
Morisaki et al.

(10) Patent No.: US 8,648,946 B2
(45) Date of Patent: Feb. 11, 2014

(54) IMAGE PROCESSING DEVICE, IMAGE PROCESSING METHOD, AND SOLID-STATE IMAGE PICKUP DEVICE

(75) Inventors: Motohiro Morisaki, Kanagawa (JP); Naoto Watanabe, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 38 days.

(21) Appl. No.: 13/540,986

(22) Filed: Jul. 3, 2012

(65) Prior Publication Data

US 2013/0010166 A1    Jan. 10, 2013

(30) Foreign Application Priority Data

Jul. 4, 2011  (JP) ................................. 2011-148405

(51) Int. Cl.
*H04N 5/335* (2011.01)
*H04N 5/217* (2011.01)

(52) U.S. Cl.
USPC .......................................... 348/294; 348/241

(58) Field of Classification Search
USPC ................................................. 348/241, 294
See application file for complete search history.

(56) References Cited

U.S. PATENT DOCUMENTS

| | | | | |
|---|---|---|---|---|
| 5,512,947 | A  * | 4/1996 | Sawachi et al. | 348/243 |
| 7,187,409 | B2 * | 3/2007 | Nakahira et al. | 348/243 |
| 7,868,935 | B2 * | 1/2011 | Egawa | 348/243 |
| 7,920,181 | B2 * | 4/2011 | Kokubo et al. | 348/241 |
| 8,040,404 | B2 * | 10/2011 | Hagiwara | 348/243 |
| 8,384,806 | B2 * | 2/2013 | Robinson et al. | 348/243 |
| 2007/0075772 | A1 * | 4/2007 | Kokubo et al. | 330/250 |
| 2007/0139539 | A1 * | 6/2007 | Ohara et al. | 348/243 |
| 2008/0284889 | A1 * | 11/2008 | Kinoshita | 348/308 |

FOREIGN PATENT DOCUMENTS

| | | |
|---|---|---|
| JP | 2006-157263 | 6/2006 |
| JP | 2006-203308 | 8/2006 |
| JP | 2007-288562 | 11/2007 |
| JP | 2009-284392 | 12/2009 |

* cited by examiner

*Primary Examiner* — Lin Ye
*Assistant Examiner* — Amy Hsu
(74) *Attorney, Agent, or Firm* — Oblon, Spivak, McClelland, Maier & Neustadt, L.L.P.

(57) ABSTRACT

According to one embodiment, an image processing device includes a black level regulating unit. The black level regulating unit has a frame integration average holding unit. A frame integration average is an integration average of an optical black signal using a video frame as a unit. The frame integration average holding unit holds the frame integration average as a signal to be applied to a black level regulation of an effective pixel signal. The frame integration average holding unit updates the frame integration average when an image pickup condition is changed.

19 Claims, 3 Drawing Sheets

IMAGE PROCESSING DEVICE, IMAGE PROCESSING METHOD, AND SOLID-STATE IMAGE PICKUP DEVICE

CROSS-REFERENCE TO RELATED APPLICATIONS

This application is based upon and claims the benefit of priority from Japanese Patent Application No. 2011-148405, filed on Jul. 4, 2011; the entire contents of all of which are incorporated herein by reference.

FIELD

Embodiments described herein relate generally to an image processing device, an image processing method, and a solid-state image pickup device.

BACKGROUND

As a main cause for a deterioration in the picture quality of a solid-state image pickup device, for example, there is known a noise generated every horizontal line (row), that is, a so-called transverse stripe noise. The transverse stripe noise is mainly generated in reset when a reading operation for each horizontal line is carried out. Moreover, some solid-state image pickup devices serve to subtract an average for each line of an OB signal sent from a horizontal optical black unit (OB unit) every horizontal line of an image sensor. The solid-state image pickup devices can effectively remove a noise generated on the same level in an effective pixel unit and the horizontal OB unit in an image sensor and can regulate a black level of the effective pixel signal into the level of the OB signal.

On the other hand, in the case in which noises having different levels are generated in the effective pixel unit and the horizontal OB unit, the subtraction processing reduces precision in a noise reduction, and furthermore, influences a black level regulation. In this case, the solid-state image pickup device can make, as an alternative, processing for using a vertical OB unit in place of the horizontal OB unit, for example. In the case in which such alternative means is not present, however, the solid-state image pickup device carries out processing for using the horizontal OB unit while taking such a risk that the black level regulation is adversely affected. Alternatively, the solid-state image pickup device uniformly stops noise reduction processing and carries out the black level regulation into a certain level which is preset. Thus, the solid-stage image pickup device carries out useless processing due to a structure for reducing a noise in the black level regulation in some cases. Consequently, it is hard to execute effective noise reduction processing.

DETAILED DESCRIPTION

In general, according to one embodiment, an image processing device has a black level regulating unit. The black level regulating unit regulates a black level of an effective pixel signal based on an optical black signal. The optical black signal is read from an optical black unit in which a photoelectric converting element is shielded. The effective pixel signal is read from an effective pixel unit in which a light is incident on the photoelectric converting element. The black level regulating unit has a frame integration average holding unit. The frame integration average holding unit calculates a frame integration average. The frame integration average is an integration average of the optical black signal using a video frame as a unit. The frame integration average holding unit holds the frame integration average as a signal to be applied to a black level regulation of the effective pixel signal. The frame integration average holding unit updates the frame integration average when an image pickup condition is changed.

Exemplary embodiments of an image processing device, an image processing method, and a solid-state image pickup device will be described below in detail with reference to the accompanying drawings. The present invention is not restricted to these embodiments.

Figure 1:
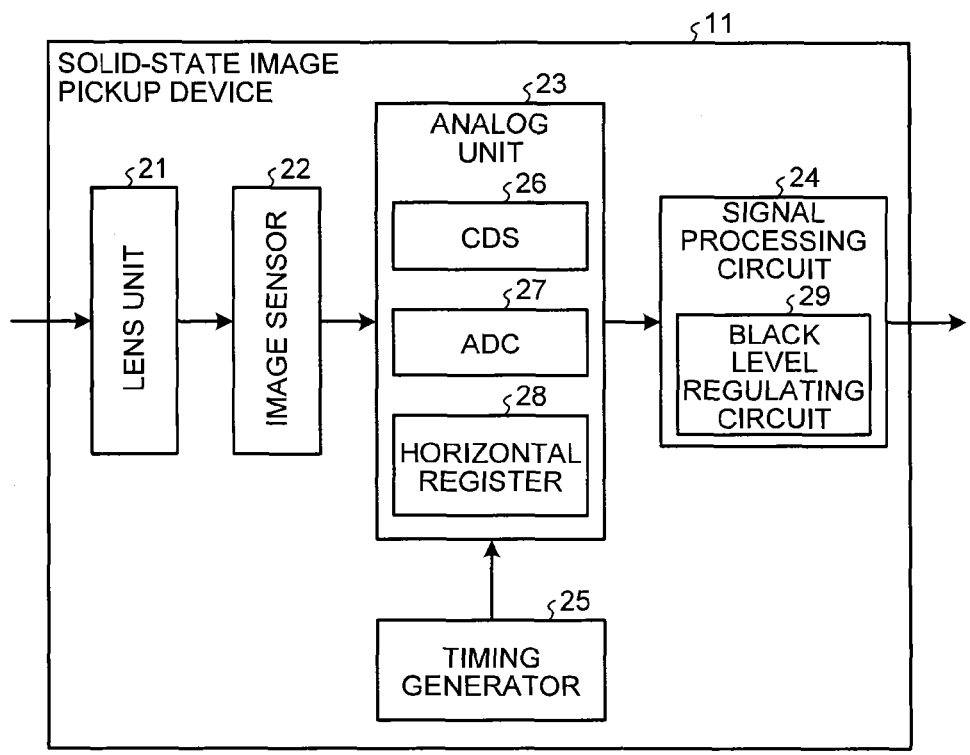
FIG. 1 is a block diagram showing a schematic structure of a solid-state image pickup device according to a first embodiment.
Figure 2:
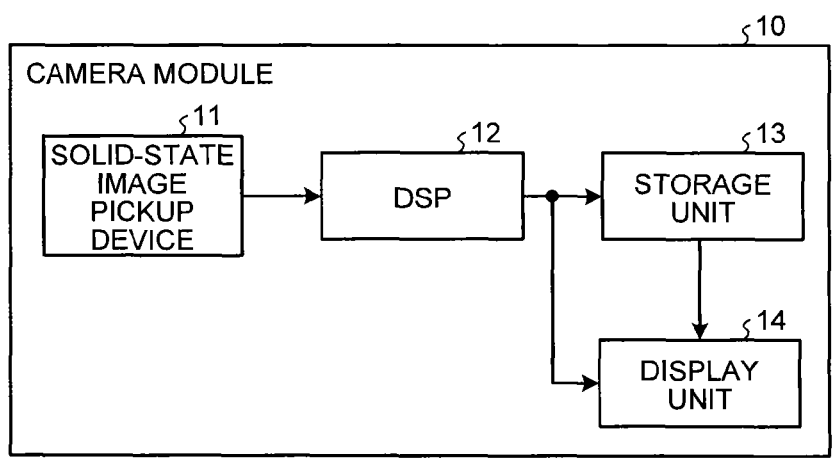
FIG. 2 is a block diagram showing a schematic structure of a camera module including the solid-state image pickup device illustrated in FIG. 1.

FIG. 1 is a block diagram showing a schematic structure of a solid-state image pickup device according to a first embodiment. FIG. 2 is a block diagram showing a schematic structure of a camera module including the solid-state image pickup device illustrated in FIG. 1.

A camera module 10 has a solid-state image pickup device 11, a digital signal processor (DSP) 12, a storage unit 13, and a display unit 14. The solid-state image pickup device 11 picks up a subject image. The DSP 12 executes signal processing for an image signal obtained by the image pickup in the solid-state image pickup device 11.

The storage unit 13 stores an image subjected to the signal processing in the DSP 12. The storage unit 13 outputs an image signal to the display unit 14 in response to an operation of a user or the like. The display unit 14 displays an image in response to an image signal input from the DSP 12 or the storage unit 13. The display unit 14 is a liquid crystal display, for example.

The solid-state image pickup device 11 has a lens unit 21, an image sensor 22, an analog unit 23, a signal processing circuit (an image processing device) 24, and a timing generator 25. The lens unit 21 takes in a light from a subject and forms a subject image through the image sensor 22.

The image sensor 22 is a CMOS (complementary metal oxide semiconductor) image sensor, for example. The image sensor 22 converts the light taken in through the lens unit 21 into a signal charge and generates an analog image signal.

Figure 3:
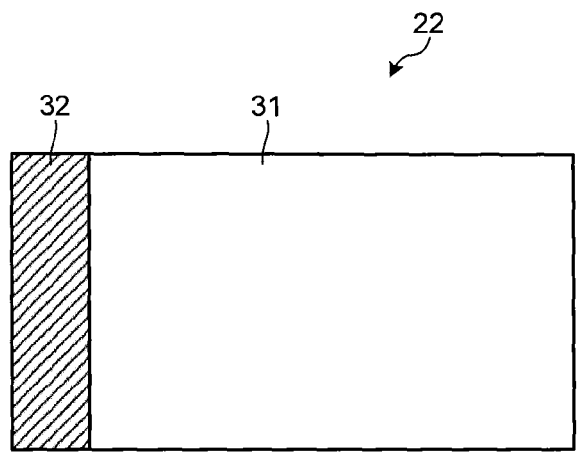
FIG. 3 is a schematic plan view showing an image sensor.

FIG. 3 is a schematic plan view showing the image sensor. The image sensor 22 has a plurality of pixel cells. Each of the pixel cells includes a photoelectric converting element for converting a light transmitted from the subject into a signal charge, and a detecting unit for converting the signal charge from the photoelectric converting element into a voltage (both of which are not shown). The pixel cell is arranged in a two-dimensional direction in a vertical direction (a column direction) and a horizontal direction (a row direction).

The image sensor 22 has an effective pixel unit 31 and an optical black (OB) unit 32 provided on an outside of the effective pixel unit 31. The effective pixel unit 31 is formed by a pixel cell in which a light is incident on the photoelectric converting element. The effective pixel unit 31 outputs an effective pixel signal corresponding to an intensity of a light which is incident on the photoelectric converting element.

The OB unit 32 is a horizontal OB unit disposed on an upstream side in a horizontal transfer direction with respect to the effective pixel unit 31. The OB unit 32 is formed by a pixel cell in which the photoelectric converting element is shielded by a shielding member such as an aluminum member. The OB unit 32 outputs an OB signal through the photoelectric converting element in a shielding state. The image sensor 22 may be provided with a vertical OB unit disposed on an upstream side or a downstream side in a vertical transfer direction with respect to the effective pixel unit 31 in addition to the OB unit 32.

The analog unit 23 has a correlated double sampling unit (CDS) 26, an analog/digital converter (ADC) 27, and a horizontal register 28. The CDS 26 carries out processing for reducing a fixed pattern noise over a signal sent from each pixel of the image sensor 22. The ADC 27 converts a signal transferred to a vertical reading line (not shown) from an analog system to a digital system. The horizontal register 28 sequentially reads the signal converted into the digital system through the ADC 27.

The timing generator 25 supplies a timing for reading a signal from each pixel of the image sensor 22 and a control pulse of the CDS 26. The signal processing circuit 24 executes various signal processings over a digital image signal obtained in the analog unit 23. The signal processing circuit 24 has a black level regulating circuit (a black level regulating unit) 29.

Figure 4:
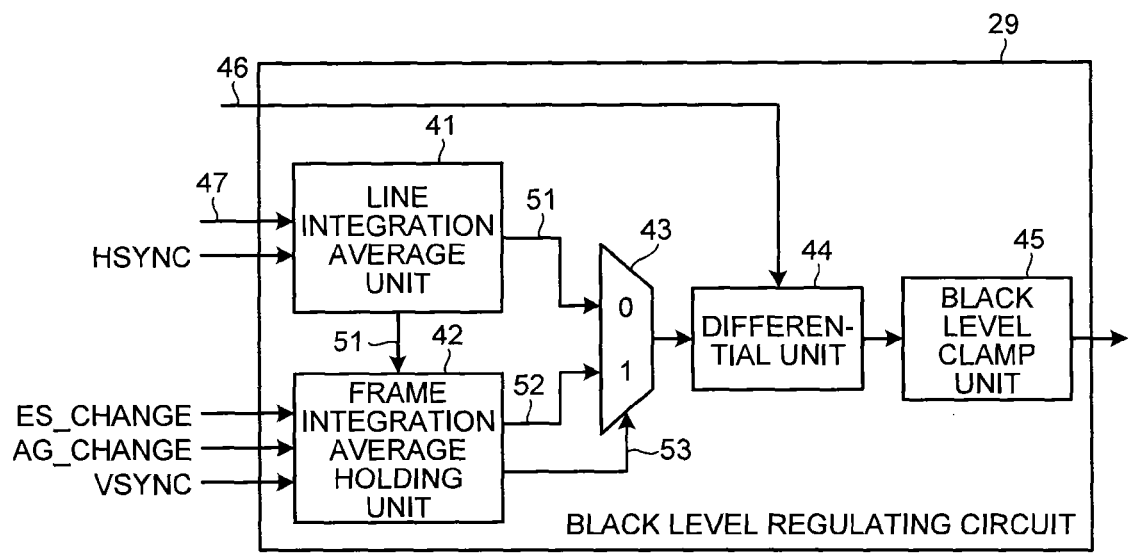
FIG. 4 is a block diagram showing a structure of a black level regulating circuit.

FIG. 4 is a block diagram showing a structure of the black level regulating circuit. The black level regulating circuit 29 regulates a black level of an effective pixel signal 46 sent from the effective pixel unit 31 based on an OB signal 47 sent from the OB unit 32. The black level regulating circuit 29 has a line integration average unit 41, a frame integration average holding unit 42, a signal selecting unit 43, a differential unit 44, and a black level clamp unit 45.

The line integration average unit 41 integrates the OB signal 47 every horizontal line in response to a horizontal synchronizing signal (HSYNC), and calculates a line integration average 51 of the OB signal 47. The frame integration average holding unit 42 further integrates the line integration average 51 every video frame in response to a vertical synchronizing signal (VSYNC), thereby calculating a frame integration average 52 of the OB signal 47.

The frame integration average holding unit 42 holds (latches) the calculated frame integration average 52 as a signal to be applied to the black level regulation of the effective pixel signal 46. The frame integration average holding unit 42 outputs a control signal 53 to the signal selecting unit 43.

The signal selecting unit 43 selects ether a first signal or a second signal in response to the control signal 53 sent from the frame integration average holding unit 42. The first signal is set to be the frame integration average 52 held by the frame integration average holding unit 42. The second signal includes signals other than the first signal. The second signal is set to be the line integration average 51 calculated by the line integration average unit 41, for example.

The differential unit 44 outputs a difference between the effective pixel signal 46 and the signal selected by the signal selecting unit 43. The black level clamp unit 45 clams the black level of the effective pixel signal 46 into a predetermined standard level. For example, the signal processing circuit 24 includes a register for holding the standard level.

The black level regulating circuit 29 outputs the effective pixel signal 46 subjected to the clamp in the black level clamp unit 45.

The frame integration average holding unit 42 accepts an input of a signal (ES_CHANGE) for giving a notice of a change in an automatic shutter time and a signal (AG_CHANGE) for giving a notice of a change in an analog gain. The frame integration average holding unit 42 outputs "1" as the control signal 53, for example, as long as neither ES_CHANGE nor AG_CHANGE is input. The signal selecting unit 43 selects the frame integration average 52 as a signal to be applied to the black level regulation of the effective pixel signal 46 while the control signal 53 is "1".

At this time, the differential unit 44 carries out processing for subtracting the frame integration average 52 from the effective pixel signal 46. The differential unit 44 continuously executes the subtraction processing using the same frame integration average 52 as long as the automatic shutter time and the analog gain are not changed.

When accepting the input of at least one of ES_CHANGE and AG_CHANGE, the frame integration average holding unit 42 newly starts the calculation of the frame calculation average 52. Moreover, the frame integration average holding unit 42 outputs "0" as the control signal 53, for example, by accepting the input of at least one of ES_CHANGE and AG_CHANGE. The signal selecting unit 43 selects the line integration average 51 as a signal to be applied for the black level regulation of the effective pixel signal 46 while the control signal 53 is "0".

At this time, the differential unit 44 carries out processing for subtracting the line integration average 51 from the effective pixel signal 46. The line integration average unit 41 switches the line integration average 51 every line. The differential unit 44 uses the line integration average 51 in the same line as the effective pixel signal 46 to be a target of the subtraction processing in the calculation with the effective pixel signal 46.

When the calculation of the new frame integration average 52 is completed, the frame integration average holding unit 42 updates the frame integration average 52 held till that time into the new frame integration average 52. When the update of the frame integration average 52 is completed, the frame integration average holding unit 42 outputs "1" to the signal selecting unit 43. When the input from the frame integration average holding unit 42 is switched into "1", the signal selecting unit 43 changes over the selection from the line integration average 51 to the frame integration average 52. The differential unit 44 executes subtraction processing using the frame integration average 52 for the effective pixel signal 46 for a frame after the frame in which the frame integration average 52 is calculated in the frame integration average holding unit 42.

Usually, the black level converges on almost the same value for each frame as long as an image pickup condition such as the automatic shutter time or the analog gain is not changed. The black level regulating circuit 29 holds the frame integration average 52 depending on a certain image pickup condition until the image pickup condition is changed, and uses the frame integration average 52 in the black level regulation. The black level regulating circuit 29 continuously carries out the black level regulation on the same level if the image pickup condition is not changed also in the case in which a fluctuation is caused in noise levels of the effective pixel unit 31 and the OB unit 32.

Consequently, the black level regulating circuit 29 can execute a stable black level regulation without influencing the fluctuation in the noise level which is caused singly. By applying, to the black level regulation, the frame integration average 52 held by the frame integration average holding unit 42 while the image pickup condition is not changed, the black level regulating circuit 29 can relieve a burden of the calculation processing as compared with the case in which the OB signal 47 is always integrated.

The black level regulating circuit 29 executes the black level regulation using the line integration average 51 when the image pickup condition is changed, thereby enabling a reduction in a transverse stripe noise in a situation in which a noise tends to be generated. The signal processing circuit 24 can suppress useless processing due to a structure for reducing a noise, thereby enabling an effective execution of noise reduction processing.

Moreover, the black level regulating circuit 29 updates the frame integration average 52 depending on the change in the image pickup condition, thereby enabling the black level regulation corresponding to the change in the image pickup condition. Furthermore, the black level regulating circuit 29 can continuously carry out the noise reduction processing using the line integration average 51 while waiting for the calculation of the frame integration average 52.

The frame integration average holding unit 42 is not restricted to the update of the frame integration average 52 depending on either ES_CHANGE or AG_CHANGE. It is sufficient that the frame integration average holding unit 42 updates the frame integration average 52 depending on the change in any of various conditions to be the image pickup conditions.

Figure 5:
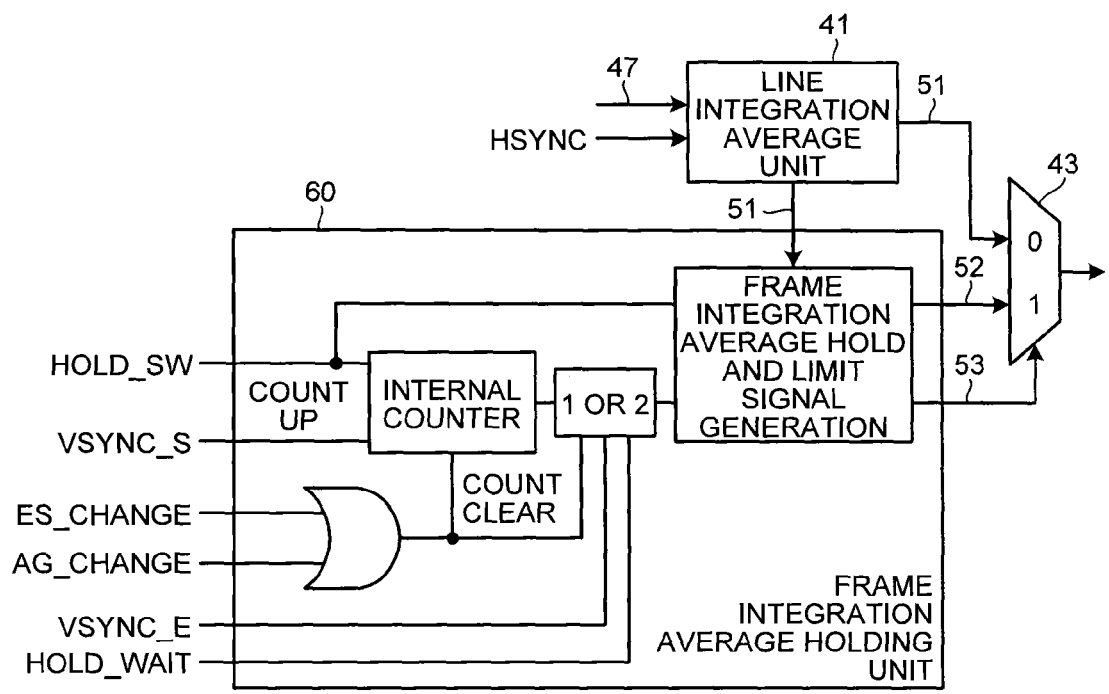
FIG. 5 is a block diagram showing a structure of a main part of a black level regulating circuit according to a second embodiment.

FIG. 5 is a block diagram showing a structure of a main part of a black level regulating circuit according to a second embodiment. The black level regulating circuit according to the present embodiment has the same structure as the black level regulating circuit 29 according to the first embodiment except that a frame integration average holding unit 60 is provided in place of the frame integration average holding unit 42 (see FIG. 4). The same portions as those in the first embodiment have the same reference numerals and repetitive description will be omitted properly.

The frame integration average holding unit 60 accepts an input of ES_CHANGE, AG_CHANGE, a signal (VSYNC_S) for giving a notice of a rise (start) of a vertical synchronizing signal, a signal (VSYNC_E) for giving a notice of a fall (end) of the vertical synchronizing signal, a hold ON/OFF register value (HOLD_SW), and a hold timing switching register value (HOLD_WAIT).

HOLD_SW indicates a signal for giving an instruction for starting an operation for updating a frame integration average 52. HOLD_WAIT indicates a signal for giving an instruction for a timing for holding the frame integration average 52. For example, it is assumed that HOLD_WAIT "0" gives an instruction for latching the frame integration average 52 after a single frame. It is assumed that the HOLD_WAIT "1" gives an instruction for latching the frame integration average 52 after two frames.

The frame integration average holding unit 60 starts count through an internal counter when HOLD_SW is ON. The internal counter adds one to the count every time VSYNC_S is input. The frame integration average holding unit 60 starts the count through the internal counter and the integration of the line integration average 51.

The frame integration average holding unit 60 starts the count through the internal counter, and furthermore, outputs "0" as a control signal 53, for example. A signal selecting unit 43 selects a line integration average 51 as a signal to be applied to the black level regulation of an effective pixel signal 46 while the control signal 53 is "0".

In the case in which VSYNC_E is input and HOLD_WAIT is "0", the frame integration average holding unit 60 holds the frame integration average 52 when a frame of count "1" through the internal counter is ended. In the case in which VSYNC_E is input and HOLD_WAIT is "1", moreover, the frame integration average holding unit 60 holds the frame integration average 52 when a frame of count "2" through the internal counter is ended. Thus, it is assumed that the frame integration average holding unit 60 can properly set, as HOLD_WAIT, the hold of one of the frame integration average 52 for a first frame and the frame integration average 52 for a second frame after the start of the integration of an OB signal 47.

When updating the frame integration average 52 to be held, the frame integration average holding unit 60 outputs "1" as the control signal 53, for example. The signal selecting unit 43 selects the frame integration average 52 as a signal to be applied to the black level regulation of the effective pixel signal 46 while the control signal 53 is "1".

When accepting the input of at least one of ES_CHANGE and AG_CHANGE, the frame integration average holding unit 60 resets the count of the internal counter. The frame integration average holding unit 60 serves as a phase for executing the latch of the frame integration average 52. The frame integration average holding unit 60 outputs "0" as the control signal 53, for example, depending on the input of at least one of ES_CHANGE and AG_CHANGE.

In the case in which the OB signal 47 is insufficiently stable in a single frame due to a disturbance or the like, the frame integration average holding unit 60 can hold the frame integration average 52 in a second frame depending on the switching of HOLD_WAIT. The black level regulating circuit 29 applies the frame integration average holding unit 60 according to the present embodiment, thereby enabling an execution of a stable black level regulation also in the case in which at least one frame is required until the OB signal 47 is stabilized. Also in the present embodiment, the signal processing circuit 24 (see FIG. 1) can suppress useless processing due to a structure for reducing a noise and can effectively execute noise reduction processing in the same manner as in the first embodiment.

The frame integration average holding unit 60 may set a timing for holding the frame integration average 52 after a third frame in addition to the case in which the same timing can be switched between the first and second frames. In the present embodiment, the frame integration average holding unit 60 selects and holds one of the frame integration average 52 in the first frame and the frame integration average 52 in the second frame depending on a stability degree of the OB signal 47. The frame integration average holding unit 60 may select the frame integration averages 52 from three frames or more in such a manner that the frame integration averages 52 in the first, second and third frames can also be selected. In addition, the frame integration average holding unit 60 can calculate the frame integration average 52 by the integration of the OB signal 47 for a single frame, and furthermore, may calculate the frame integration average 52 by the integration of the OB signals 47 in at least two frames.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device comprising a black level regulating unit configured to regulate a black level of an effective pixel signal read from an effective pixel unit in which a light is incident on a photoelectric converting element based on an optical black signal read from an optical black unit in which the photoelectric converting element is shielded, wherein the black level regulating unit has a frame integration average holding unit configured to calculate a frame integration average to be an integration average of the optical black signal using a video frame as a unit and to hold the frame integration average as a signal to be applied to a black level regulation of the effective pixel signal, and the frame integration average holding unit updates the frame integration average when an image pickup condition is changed.

2. The image processing device according to claim 1, further comprising a signal selecting unit configured to select either a first signal to be the frame integration average or a second signal other than the first signal as the signal to be applied to the black level regulation of the effective pixel signal.

3. The image processing device according to claim 2, further comprising a line integration average unit configured to calculate a line integration average to be an integration average of the optical black signal for each horizontal line, the second signal being set to be the line integration average calculated by the line integration average unit.

4. The image processing device according to claim 2, wherein the signal selecting unit selects the first signal until the image pickup condition is changed after the update of the frame integration average through the frame integration average holding unit is completed.

5. The image processing device according to claim 2, wherein the signal selecting unit selects the second signal until the update of the frame integration average through the frame integration average holding unit is completed after a signal for giving a notice of the change of the image pickup condition is input to the frame integration average holding unit.

6. The image processing device according to claim 1, wherein the frame integration average holding unit updates the frame integration average when an electronic shutter time to be the image pickup condition is changed.

7. The image processing device according to claim 1, wherein the frame integration average holding unit updates the frame integration average when an analog gain to be the image pickup condition is changed.

8. The image processing device according to claim 1, wherein the frame integration average holding unit can switch a timing for holding the frame integration average.

9. The image processing device according to claim 1, wherein the frame integration average holding unit holds, as the frame integration average, either the frame integration average in a first frame or the frame integration average in a second frame after starting an integration of the optical black signal.

10. An image processing method including regulating a black level of an effective pixel signal read from an effective pixel unit in which a light is incident on a photoelectric converting element based on an optical black signal read from an optical black unit in which the photoelectric converting element is shielded, wherein in a black level regulation of the effective pixel signal, a frame integration average to be an integration average of the optical black signal using a video frame as a unit is calculated, the frame integration average is held as a signal to be applied to the black level regulation, and the frame integration average is updated when an image pickup condition is changed.

11. The image processing method according to claim 10, wherein either a first signal to be the frame integration average or a second signal other than the first signal is selected as the signal to be applied to the black level regulation of the effective pixel signal.

12. The image processing method according to claim 11, further comprising calculating a line integration average to be an integration average of the optical black signal for each horizontal line, the second signal being set to be the line integration average.

13. The image processing method according to claim 11, wherein the first signal is selected as the signal to be applied to the black level regulation of the effective pixel signal until the image pickup condition is changed after the update of the frame integration average is completed.

14. The image processing method according to claim 11, wherein the second signal is selected as the signal to be applied to the black level regulation of the effective pixel signal until the update of the frame integration average is completed after a signal for giving a notice of the change of the image pickup condition is input.

15. The image processing method according to claim 10, wherein the frame integration average is updated when an electronic shutter time to be the image pickup condition is changed.

16. The image processing method according to claim 10, wherein the frame integration average is updated when an analog gain to be the image pickup condition is changed.

17. The image processing method according to claim 10, wherein a timing for holding the frame integration average can be switched.

18. The image processing method according to claim 10, wherein either the frame integration average in a first frame or the frame integration average in a second frame after starting an integration of the optical black signal is held as the frame integration average.

19. A solid-state image pickup device comprising:

an image sensor including an optical black unit in which a photoelectric converting element is shielded and an effective pixel unit in which a light is incident on the photoelectric converting element; and a black level regulating unit configured to regulate a black level of an effective pixel signal read from the effective pixel unit based on an optical black signal read from the optical black unit, wherein the black level regulating unit has a frame integration average holding unit configured to calculate a frame integration average to be an integration average of the optical black signal using a video frame as a unit and to hold the frame integration average as a signal to be applied to the black level regulation of the effective pixel signal, and the frame integration average holding unit updates the frame integration average when an image pickup condition is changed.

\* \* \* \* \*